(12) United States Patent
Sarkar et al.

(10) Patent No.: US 11,501,777 B2
(45) Date of Patent: Nov. 15, 2022

(54) METHODS AND SYSTEMS FOR ENABLING HUMAN-ROBOT INTERACTION TO RESOLVE TASK AMBIGUITY

(71) Applicant: Tata Consultancy Services Limited, Mumbai (IN)

(72) Inventors: Chayan Sarkar, Kolkata (IN); Pradip Pramanick, Kolkata (IN); Snehasis Banerjee, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 185 days.

(21) Appl. No.: 17/161,767

(22) Filed: Jan. 29, 2021

(65) Prior Publication Data
US 2022/0148586 A1  May 12, 2022

(30) Foreign Application Priority Data

Nov. 9, 2020 (IN) .............................. 202021048905

(51) Int. Cl.
*G10L 15/22* (2006.01)
*B25J 9/16* (2006.01)
(Continued)

(52) U.S. Cl.
CPC ............. *G10L 15/22* (2013.01); *B25J 9/1679* (2013.01); *B25J 11/0005* (2013.01);
(Continued)

(58) Field of Classification Search
CPC . G10L 15/22; G10L 15/1815; G10L 15/1822; G10L 2015/223; B25J 9/1679;
(Continued)

(56) References Cited

U.S. PATENT DOCUMENTS

| 10,706,373 | B2* | 7/2020 | Gruber | .................. H04W 4/02 |
| 11,409,295 | B1* | 8/2022 | Samdaria | ............. G05D 1/0214 |
| 2021/0373551 | A1* | 12/2021 | Sakamoto | ...... G06Q 10/063114 |

OTHER PUBLICATIONS

Pramanick el al.; Your instruction may be crisp, but not clear to me; 2019 28th IEEE International Conference on Robot and Human Interactive Communication (RO-MAN), Publisher: IEEE. (Year: 2019).*

(Continued)

*Primary Examiner* — Abul K Azad
(74) *Attorney, Agent, or Firm* — Finnegan, Henderson, Farabow, Garrett & Dunner LLP

(57) ABSTRACT

The disclosure herein relates to methods and systems for enabling human-robot interaction (HRI) to resolve task ambiguity. Conventional techniques that initiates continuous dialogue with the human to ask a suitable question based on the observed scene until resolving the ambiguity are limited. The present disclosure use the concept of Talk-to-Resolve (TTR) which initiates a continuous dialogue with the user based on visual uncertainty analysis and by asking a suitable question that convey the veracity of the problem to the user and seek guidance until all the ambiguities are resolved. The suitable question is formulated based on the scene understanding and the argument spans present in the natural language instruction. The present disclosure asks questions in a natural way that not only ensures that the user can understand the type of confusion, the robot is facing; but also ensures minimal and relevant questioning to resolve the ambiguities.

13 Claims, 7 Drawing Sheets

(51) Int. Cl.
  *B25J 11/00* (2006.01)
  *G10L 15/18* (2013.01)
  *H04W 4/021* (2018.01)

(52) U.S. Cl.
  CPC ...... *G10L 15/1815* (2013.01); *G10L 15/1822* (2013.01); *H04W 4/021* (2013.01); *G10L 2015/223* (2013.01)

(58) Field of Classification Search
  CPC .... B25J 11/0005; B25J 9/1661; H04W 4/021; G06F 40/216; G06F 40/284; G06F 40/30; G06F 40/44; G06F 40/56
  See application file for complete search history.

(56) References Cited

OTHER PUBLICATIONS

Author: Jun Hatori, Yuta Kikuchi, Sosuke Kobayashi,, Kuniyuki Takahashi, Yuta Tsuboi, Yuya Unno, Wilson Ko, Jethro Tan Title: Interactively Picking Real-World Objects with Unconstrained Spoken Language Instructions Title of the item: Computer Science—Robotics Date: Mar. 2018 Publisher: ARXIV Link: https://arxiv.org/pdf/1710.06280.pdf.

Author: Shen Li, Rosario Scalise, Henny Admoni, Stephanie Rosenthal, Siddhartha S. Srinivasa Title: Spatial References and Perspective in Natural Language Instructions for Collaborative Manipulation Title of the item: International Symposium on Robot and Human Interactive Communication (RO-MAN) Date: Aug. 2016 Publisher: IEEE Link: https://personalrobotics.cs.washington.edu/publications/li2016spatial.pdf.

Author: Emanuele Bastianelli, Danilo Croce, Andrea Vanzo, Roberto Basili, Daniele Nardi Title: A Discriminative Approach to Grounded Spoken Language Understanding in Interactive Robotics Title of the item: Fifth International Joint Conference on Artificial Intelligence Date: Aug. 2016 pp. 2747-2753 Publisher: ACM Link: https://www.ijcai.org/Proceedings/16/Papers/390.pdf.

Author: Kazuho Morohashi and Jun Miura Title: Query Generation for Resolving Ambiguity in User's Command for a Mobile Service Robot Title of the item: European Conference on Mobile Robots (ECMR) Date: Sep. 2019 pp. 2747-2753 Publisher: IEEE Link: http://www.aisl.cs.tut.ac.jp/~jun/pdffiles/morohashi-ecmr2019.pdf.

* cited by examiner

METHODS AND SYSTEMS FOR ENABLING HUMAN-ROBOT INTERACTION TO RESOLVE TASK AMBIGUITY

PRIORITY CLAIM

This U.S. patent application claims priority under 35 U.S.C. § 119 to: Indian Patent Application No. 202021048905, filed on 9 Nov. 2020. The entire contents of the aforementioned application are incorporated herein by reference.

TECHNICAL FIELD

The disclosure herein generally relates to the field of human-robot interaction (HRI), and, more particularly, to methods and systems for enabling human-robot interaction (HRI) to resolve task ambiguity.

BACKGROUND

Utility of robots cooperating among humans (referred as 'collocated robots') to perform tasks and navigate seamlessly in an environment, largely depends on easy and intuitive interaction mechanism between the robots and humans. As a result, human-robot interaction (HRI) in a natural language has gained a lot of attention in recent years. Instructing the robot in the natural language to perform a specific task may typically involves understanding an instruction of the human and then dialogue exchange for decoding an intention of the human to determine a navigational plan and to identify a desired object to perform the specific task. While executing the instruction of the human, the robot may see unforeseeable circumstances due to variations in the observed scene present in the environment. With the unforeseeable circumstances, the robots may face uncertainties or ambiguities, and therefore requires further intervention from the human. The variations may be due to either (i) the instruction from the human may be unclear or insufficient to perform the task, or (ii) ambiguity in identifying desired object from an observed scene, even when the instruction from the human is clear and sufficient to perform the task.

Conventional techniques that deal with the ambiguities, may typically initiates a further dialogue with the human and by asking questions. However, having a continuous dialogue with the human to ask a suitable question based on the observed scene until resolving the ambiguity is always challenging and the conventional techniques in the current domain are limited.

SUMMARY

Embodiments of the present disclosure present technological improvements as solutions to one or more of the above-mentioned technical problems recognized by the inventors in conventional systems.

In an aspect, there is provided a processor-implemented method for enabling human-robot interaction to resolve task ambiguity, the method comprising the steps of: receiving an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment; parsing the initial instruction text, to predict one or more task types that are present in the initial instruction text, using a task-conditional random field (task-CRF) model, wherein each task type of the one or more task types is associated with a task of the one or more tasks; performing each task type at a time, out of the one more task types, until the one or more task types are completed, by: (a) predicting one or more argument spans for the associated task type, from the initial instruction text, using an argument-conditional random field (argument-CRF) model, wherein at least an argument span of the one or more argument spans is associated with one or more objects present in the environment; (b) navigating the robot to a target location, for the associated task type, using an initial navigational plan generated based on the associated one or more argument spans and using a pre-built occupancy map of the environment; (c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object; (d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans; (e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object; (f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; (g) and performing for the associated task type, one of: (i) executing the task comprised in the associated task type, if the decision state is no-ambiguous, (ii) initiating a spatial dialogue with the user to receive a second natural language audio instruction, if the decision state is ambiguous, wherein the second natural language audio instruction is converted into a second instruction text, and repeating steps (a) through (g) by taking the second instruction text as the initial instruction text, until the decision state becomes no-ambiguous, and (iii) abort the task, if the one or more target objects not found in the target scene.

In another aspect, there is provided a system for enabling human-robot interaction to resolve task ambiguity, the system comprising: a memory storing instructions; one or more Input/Output (I/O) interfaces; and one or more hardware processors coupled to the memory via the one or more I/O interfaces, wherein the one or more hardware processors are configured by the instructions to: receive an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment; parse the initial instruction text, to predict one or more task types that are present in the initial instruction text, using a task-conditional random field (task-CRF) model, wherein each task type of the one or more task types is associated with a task of the one or more tasks; perform each task type at a time, out of the one more task types, until the one or more task types are completed, by: (a) predicting one or more argument spans for the associated task type, from the initial instruction text, using an argument-conditional random field (argument-CRF) model, wherein at least an argument span of the one or more argument spans is associated with one or more objects present in the environment; (b) navigating the robot to a target location, for the associated task type, using an initial navigational plan generated based on the associated one or more argument spans and using a pre-built occupancy map of the environment; (c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object; (d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans; (e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object; (f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; and (g) performing for the associated task type, one of: (i) execute the task comprised in the associated task type, if the decision state is no-ambiguous, (ii) initiate a spatial dialogue with the user to receive a second natural language audio instruction, if the decision state is ambiguous, wherein the second natural language audio instruction is converted into a second instruction text, and repeat steps (a) through (g) by taking the second instruction text as the initial instruction text, until the decision state becomes no-ambiguous, and (iii) abort the task, if the one or more target objects not found in the target scene.

In yet another aspect, there is provided a computer program product comprising a non-transitory computer readable medium having a computer readable program embodied therein, wherein the computer readable program, when executed on a computing device, causes the computing device to: receive an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment; parse the initial instruction text, to predict one or more task types that are present in the initial instruction text, using a task-conditional random field (task-CRF) model, wherein each task type of the one or more task types is associated with a task of the one or more tasks; perform each task type at a time, out of the one more task types, until the one or more task types are completed, by: (a) predicting one or more argument spans for the associated task type, from the initial instruction text, using an argument-conditional random field (argument-CRF) model, wherein at least an argument span of the one or more argument spans is associated with one or more objects present in the environment; (b) navigating the robot to a target location, for the associated task type, using an initial navigational plan generated based on the associated one or more argument spans and using a pre-built occupancy map of the environment; (c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object; (d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans; (e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object; (f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; and (g) performing for the associated task type, one of: (i) execute the task comprised in the associated task type, if the decision state is no-ambiguous, (ii) initiate a spatial dialogue with the user to receive a second natural language audio instruction, if the decision state is ambiguous, wherein the second natural language audio instruction is converted into a second instruction text, and repeat steps (a) through (g) by taking the second instruction text as the initial instruction text, until the decision state becomes no-ambiguous, and (iii) abort the task, if the one or more target objects not found in the target scene.

In an embodiment, the pre-built occupancy map comprises one or more geo-fencing areas present in the environment, along with associated annotations.

In an embodiment, initiating the spatial dialogue with the user to receive the second natural language audio instruction, if the decision state is ambiguous, further comprising: asking a subsequent question to the user, by the robot, wherein the subsequent question is created by customizing a predefined question template of a set of predefined question templates, based on (i) the associated dialogue state, (ii) the one or more unique candidate objects and the one or more candidate captions for each unique candidate object of the one or more unique candidate objects, and (iii) the associated one or more argument spans; and receiving the second natural language audio instruction from the user, by the robot, in response to the subsequent question asked to the user.

In an embodiment, the pairwise semantic similarity metric between (i) each caption of the one or more captions for each scene object, and (ii) each argument span of the associated one or more argument spans, is determined by: obtaining (i) a caption embedding and a caption weighted vector for the associated caption, and (ii) an argument embedding and an argument weighted vector for the associated argument span; determining a caption composite vector for the associated caption, based on the associated caption embedding and the associated caption weighted vector; determining an argument composite vector for the associated argument span, based on the associated argument embedding and the associated argument weighted vector; and determining the pairwise semantic similarity metric between (i) each caption of the one or more captions for each scene object, and (ii) each argument span of the associated one or more argument spans, based on the associated caption composite vector and the associated argument composite vector.

In an embodiment, the one or more candidate captions for each unique candidate object of the one or more unique candidate objects, from the one or more relevant captions for each candidate scene object, are determined by performing at least one of: (i) removing a set of relevant captions out of the one or more relevant captions, that are redundant; and (ii) merging a set of relevant captions out of the one or more relevant captions for each candidate scene object, that uniquely define the candidate scene object.

In an embodiment, the predefined set of dialogue states comprises: (i) no question (NQ), (ii) ambiguous attribute (AA), (iii) implicit matching attribute (IMA), (iv) attribute mismatch (AM), (v) attribute not found (ANF), (vi) ambiguous object and attribute (AOA), and (vii) not found (NF).

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
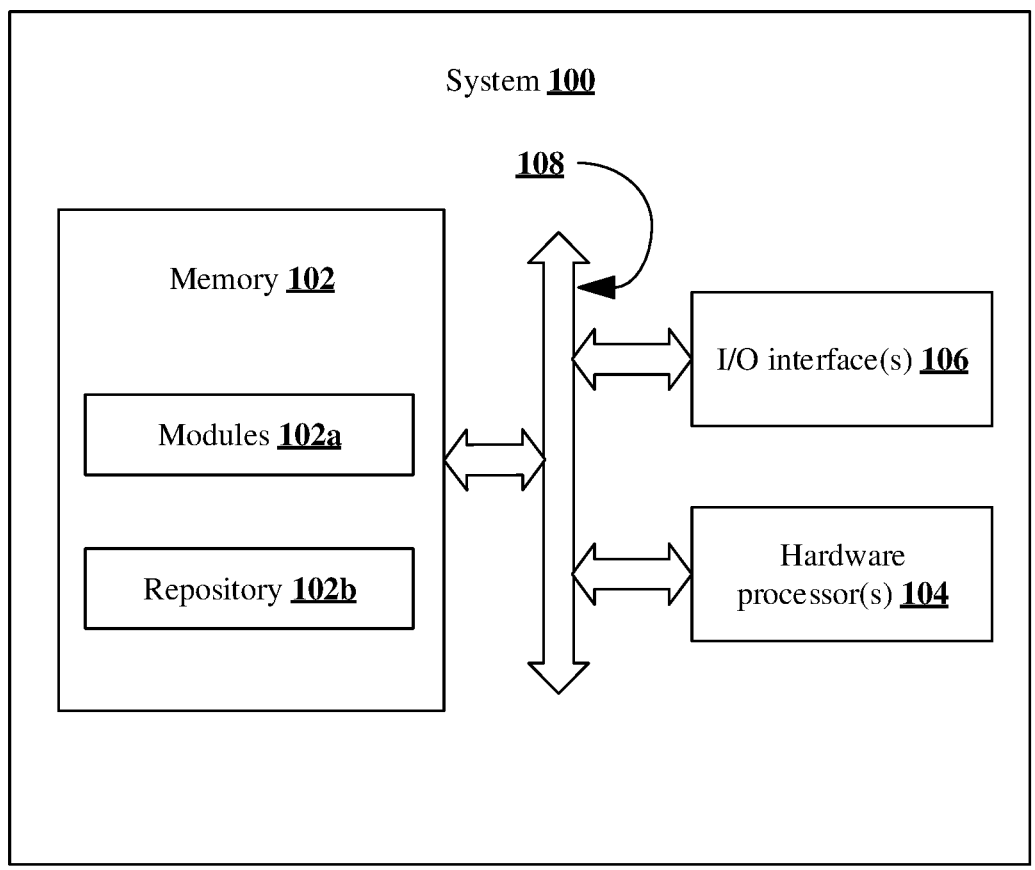
FIG. 1 is an exemplary block diagram of a system 100 for enabling human-robot interaction to resolve task ambiguity, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Application of robots is mainly to employ and engage in various activities where the robots may lend a helping hand and make living space or work space simpler and coherent. Though the number of robots in daily surrounding is increasing day-by-day, usability remains restricted due to lack of intuitive interaction interface, especially for non-expert users. On another hand, a natural language interaction increases the acceptability and usability of the robots. As a result, a large number of research efforts have focused on enabling the natural human-robot interaction.

The robot first needs to understand the instruction of the user provided in a natural language and to determine a target scene from the understanding, such that a desired goal point may be determined. As natural language instructions are usually short and concise, there may not be enough information present in the natural language instructions to determine the target scene the desired goal point. Hence the natural language instructions are prone to ambiguity and incompleteness that may require human-robot dialogue. Further, the robots may also encounter unexpected situations during the execution of the plan, despite understanding the meaning of the instruction. The unexpected situations may be due to various reasons including but are not limited to (i) the instruction from the human may be unclear or insufficient to perform the task, or (ii) ambiguity in identifying desired object from the observed scene, even when the instruction from the human is clear and sufficient to perform the task. Further, there may be several different ambiguities may be encountered due to the mentioned reasons.

Conventional techniques use a combination of natural language instruction understanding and visually grounding the understanding on the observed scene to identify the target objects associated with the task. Some conventional techniques specifically focused only on understanding the meaning of the instruction for generating a plan assuming that the generated plan may be executed without a failure or without requiring further intervention from the human. While, some conventional techniques focused only on visual understanding of the environment with respect to the instruction to perform the task. Some conventional techniques focused on visual grounding of natural descriptions (captions) of the objects present in the environment, to identify the desired object without tackling the ambiguities by having a dialogue with the human. Further few conventional techniques focused on initiating the dialogue with the human in case of ambiguities by asking a suitable questions. However having a continuous dialog with the human in dealing with multiple ambiguities and asking different type of questions based on the visual understanding of the environment are limited in the art.

The present disclosure herein provides methods and systems for enabling human-robot interaction to resolve task ambiguity, solve the technical problems by using a concept called Talk-to-Resolve (TTR). TTR means initiating a continuous dialogue between the robot and the user, where the robot asks a suitable question to the user by interpreting the observed scene understanding until the ambiguities are resolved.

Given a task instruction in the natural language and the observed scene from ego-view of the robot, an execution plan is generated if a) the task is properly understood and executable in a current scenario, or b) engage in a dialogue with the user if there is any ambiguity in understanding what action is to be performed. The generation of execution plan involves identifying an exact and/or alternate objects in the observed scene to perform the action so that the plan may be generated with the help of the user (human co-worker). An incremental grounding strategy is applied to generate a semi-grounded execution plan first. The visual grounding of the target object is attempted only when is required by the current action. During the task execution, the present analyses the current ego-view of the robot to decide if such grounding is possible. In the cases of grounding failure and ambiguity, the present disclosure invokes for spatial dialogue, which uses visual uncertainty analysis to formulate questions for the user.

The present disclosure detects a nature of the problem the robot is facing by identifying an ambiguity type from a different types of ambiguities that cannot be predicted beforehand. Then, a subsequent question is how to convey the veracity of the problem to the user and seek guidance or directive is executed until all the ambiguities are resolved.

In the context of the present disclosure, the robot may be any movable equipment or device such as a movable robot, a humanoid robot, an industrial robot, a telepresence robot and so on. Further, the robot may be a collocated robot which means the robot that perform the tasks in collaboration with human (s). For simplicity, only the term 'robot' is used from hereafter. The robot may include specific components or resources to perform the tasks such as picking, holding, releasing, and so on.

Also, the terms such as 'user', 'subject', 'co-worker', and 'human' are interchangeably used based on the context, but they refer to any living being preferably the human who can provide an instruction to the robot to perform specific task (s) and further may initiate a dialogue (conversation) until the specific task is completed. Though the present disclosure is mainly focused to enable the human-robot interaction for performing the task in indoor environments, but the scope of the invention is not limited to the indoor environments.

Referring now to the drawings, and more particularly to FIG. 1 through FIG. 7, where similar reference characters denote corresponding features consistently throughout the figures, there are shown preferred embodiments and these embodiments are described in the context of the following exemplary systems and/or methods.

FIG. 1 is an exemplary block diagram of the system 100 for enabling human-robot interaction to resolve task ambiguity, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

In an embodiment, the system 100 may be configured inside the robot for enabling the human-robot interaction to resolve task ambiguity. In another embodiment, the system 100 may be connected to the robot externally through the I/O interface(s) 106 either with a wired connection, or a wireless connection, or both, for enabling the human-robot interaction to resolve task ambiguity.

Figure 2:
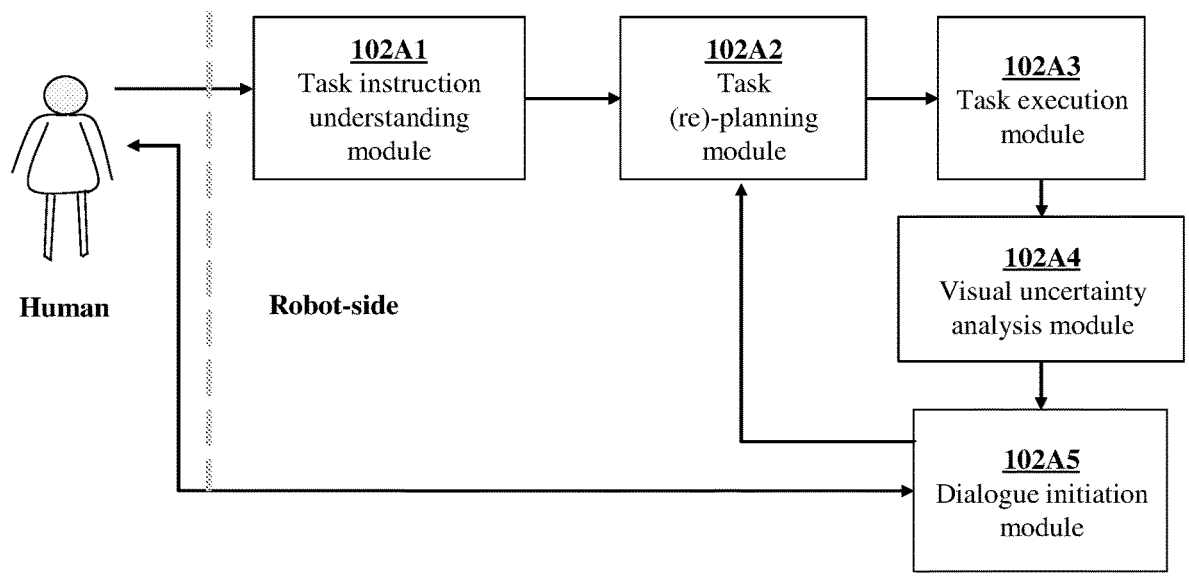
FIG. 2 is an exemplary block diagram illustrating modules of the system 100 of FIG. 1 for enabling human-robot interaction to resolve task ambiguity, in accordance with some embodiments of the present disclosure.
Figure 3A:
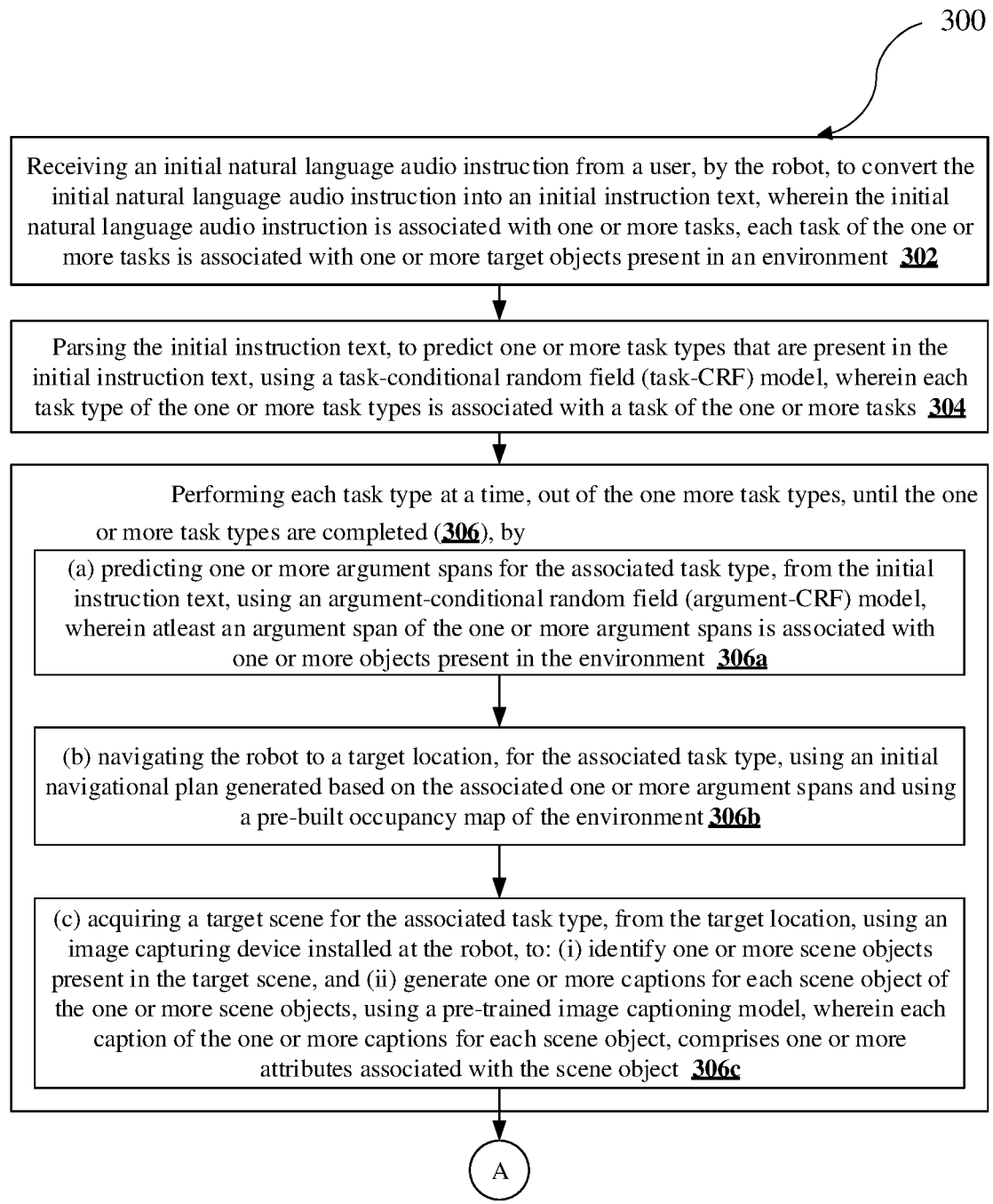
FIG. 3A and FIG. 3B illustrate exemplary flow diagrams of a processor-implemented method 300 for enabling human-robot interaction to resolve task ambiguity, in accordance with some embodiments of the present disclosure.
Figure 3B:
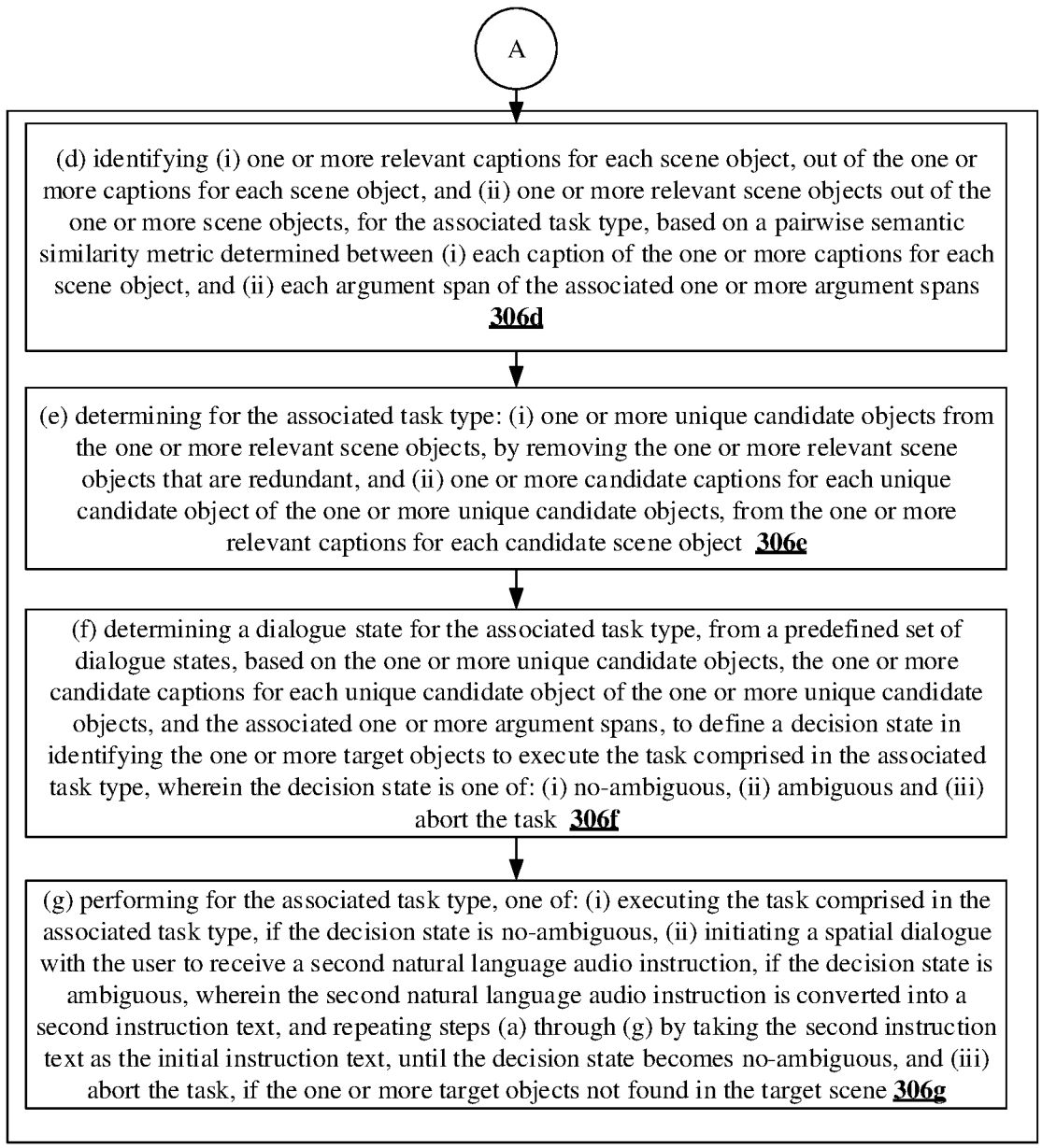

Referring collectively to FIG. 2, FIG. 3A and FIG. 3B, components and functionalities of the system 100 are described in accordance with an example embodiment of the present disclosure. For example, FIG. 2 is an exemplary block diagram illustrating modules of the system 100 of FIG. 1 for enabling human-robot interaction to resolve task ambiguity, in accordance with some embodiments of the present disclosure.

As shown in FIG. 2, the modules include a task instruction understanding module 102A1, a task (re)-planning module 102A2, a task execution module 102A3, a visual uncertainty analysis module 102A4, and a dialogue initiation module 102A5. In an embodiment, the task instruction understanding module 102A1 parses the given natural language instruction to a shallow tree of task types and argument spans present in the given natural language instruction. Each task type defines a task that is conveyed in the given natural language instruction. The argument spans define a set of argument spans associated with each task type, that are present in the given natural language instruction. The task (re)-planning module 102A2 generates a task execution plan for each task type, by translating the parsed natural language instruction to an abstract action sequence to be actuated by the robot, which satisfies a task goal for example, picking a desired target object after identification. The visual uncertainty analysis module 102A4 determines the ambiguity state based on the argument spans and the observations from the target scene, In case of ambiguities, the dialogue initia-tion module 102A5 initiate a dialogue with the user by asking a suitable question based on the argument spans and the target scene analysis. The task (re)-planning module 102A2 further re-plans after resolving ambiguities by taking a feedback from the user. The task execution module 102A3 translates the task execution plan to robot actions for completing the task associated with each task type.

FIG. 3A and FIG. 3B illustrate exemplary flow diagrams of a processor-implemented method 300 for enabling human-robot interaction to resolve task ambiguity, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive an initial natural language audio instruction from the user, by the robot. The initial natural language audio instruction given to the robot include at least a task to be executed. The task is defined as high-level action that may be expressed using an unambiguous goal. To satisfy the goal, the robot needs to execute one or more low-level actions, and then the correct action sequence for a given initial state may be found by task planning.

Hence, the initial natural language audio instruction is associated with one or more tasks to be performed by the robot. The initial natural language audio instruction includes a set of words in a speech or audio form, spoken by the user. Each task of the one of the one or more tasks is associated with one or more target objects present in an environment. The received initial natural language audio instruction is converted from speech form to text form, to obtain an initial instruction text. In an embodiment, a speech-to text conversion tool may be used to convert the initial natural language audio instruction into the initial instruction text. The initial instruction text includes a set words in the text form, indicating one or more tasks to be performed by the robot.

The environment may include one or more objects based on a type of the environment. The one or more target objects may be an object or some of the objects associated with the task, out of the one or more objects present in the environment. The environment may be a predefined environment defined by the user in which the robot may be configured to perform the one or more tasks that are conveyed in the initial natural language audio instruction. In an embodiment, the environment may include a set of boundaries within which the robot may navigate for performing the one or more tasks. In an embodiment, a type of the environment include but are not limited to indoor environments such as home, office, factory, work place, shop floor, restaurant, hospital and so on.

Though the present disclosure takes the natural language instruction in audio form as an input, the scope of the invention is not limited to the audio form. The present invention also works by taking the natural language instruction in the text form directly. In this case the speech-to text conversion tool may be required.

An exemplary initial instruction text may be 'take a red cup from the kitchen'. For the exemplary initial instruction text, the robot has to perform the tasks such as go to kitchen first, identify the red cup present in the kitchen, take the red cup and give the red cup to the user.

At step 304 of the method 300, the one or more hardware processors 104 of the system 100 are configured to parse the initial instruction text to predict one or more task types that are present in the initial instruction text, using a task-conditional random field (task-CRF) model. In an embodiment, a pre-trained task-conditional random field (task-CRF) model is used to parse the initial instruction text to predict the one or more task types. Each task type of the one or more task types is associated with a task of the one or more tasks that are conveyed in the initial natural language audio instruction.

Given the natural instruction text $I=\{w_{1:n}\}$, the pre-trained task-conditional random field (task-CRF) model predicts a task type sequence $L_T=\{L_{T1:n}\}$, $L_{Ti} \in T \cup 0$, where T is a set of task types and 0 is a special label denoting a set of non-task types. Here n represent a number of words present in the natural instruction text I, and Ti represents one or more task types predicted based on the words present in the natural instruction text I. The set of non-task types are ignored in further processing as they do not indicate any tasks to be completed. If multiple task types present in the task type sequence $L_T$, then all the task types are serialized to perform one task type at a time, to complete all the task types one after the other, in a particular required sequence.

At step 306 of the method 300, the one or more hardware processors 104 of the system 100 are configured to perform each task type at a time, out of the one more task types, until the one or more tasks associated with the one or more task types are completed.

At step 306a of the method 300, the one or more hardware processors 104 of the system 100 are configured to predict one or more argument spans for the associated task type, from the initial instruction text, using an argument-conditional random field (argument-CRF) model. In an embodiment, a pre-trained argument-conditional random field (argument-CRF) model is used to predict one or more argument spans for the associated task type from the initial instruction text. At least one argument span out of the one or more argument spans is associated with one or more objects present in the environment.

Given the task type and the initial instruction text, the pre-trained argument-conditional random field (argument-CRF) model predicts the one or more argument spans for each task type present in the initial instruction text. In an embodiment, the task instruction understanding component 102A1 takes care of predicting the one or more task types and the one or more argument spans for each task type of the one or more task type.

For the exemplary initial instruction text, 'take a red cup from the kitchen', the task type is 'take' and the argument spans are (i) 'red cup', and (ii) 'from the table'. In this case, the argument span 'red cup' refers to the object and the argument span 'from the table' refers to a source or a geo-fencing area where the object red cup is present.

$$[\text{Take}]_{taking}[\text{a red cup}]_{object}[\text{from the kitchen}]_{source}$$

At step 306b of the method 300, the one or more hardware processors 104 of the system 100 are configured to navigate the robot to a target location, for the associated task type, using an initial navigational plan. The initial navigational plan is generated based on the associated one or more argument spans and using a pre-built occupancy map of the environment. The geo-fencing area present in the one or more argument spans for the associated task type is identified first (kitchen is the source from the argument span 'from the kitchen' in the exemplary initial instruction text), then the initial navigational plan is generated using the pre-built occupancy map of the environment.

In an embodiment, the pre-built occupancy map comprises one or more geo-fencing areas (or land marks) present in the environment. Each geo-fencing area of the one or more geo-fencing areas are annotated with the associated name (for example, kitchen). In an embodiment, the pre-built occupancy map of the environment may be stored in a knowledge base that may be present in the repository 102b of the system 100. In an embodiment, the robot may be navigated to the target location based on the initial navigational plan, using a robot operating system (ROS) planner.

At step 306c of the method 300, the one or more hardware processors 104 of the system 100 are configured to acquire a target scene for the associated task type, from the target location. An image capturing device is installed at the robot to acquire the target scene for the associated task type from the target location. The target scene is analyzed to identify one or more scene objects first. The one or more scene objects are the objects that are present in the target scene. Next, one or more captions for each scene object of the one or more scene objects, is generated. A pre-trained image captioning model is used to generate the one or more captions for each scene object of the one or more scene objects present in the target scene.

In an embodiment, the pre-trained image captioning model named 'Dense-cap' may be used to generate the one or more captions for each scene object objects present in the target scene. The pre-trained image captioning model takes the target scene as an input and predicts bounding boxes, a bounding box for each scene object of the one or more scene objects present in the target scene. Then the pre-trained image captioning model generates one or more captions for the each scene object of the one or more scene objects. Also the pre-trained image captioning model generates the one or more captions for each scene object, ranked based on the associated probability. The more the rank the more the relevancy of the caption for the associated scene caption.

The caption refers to a natural language description of the associated scene object. The natural language description includes one or more attributes associated with the scene object. The one or more attributes describes properties of the associated scene object. In an embodiment, the properties includes but are not limited to physical properties such as a size, a shape, a color and so on.

At step 306d of the method 300, the one or more hardware processors 104 of the system 100 are configured to identify one or more relevant captions for each scene object, out of the one or more captions for each scene object, for the associated task type. The task-(re) planning module 102A2 apply visual grounding the one or more argument spans on the target scene to identify the target object to generate the initial plan for task execution. The visual uncertainty analysis module 102A4 determines if such grounding is possible or not to uniquely identify the target object.

A pairwise semantic similarity metric is used to identify one or more relevant captions for each scene object, out of the one or more captions. The pairwise semantic similarity metric is determined for each caption-argument span pair associated with the task type. In particular, the pairwise semantic similarity metric is determined between (i) each caption of the one or more captions for each scene object, and (ii) each argument span of the associated one or more argument spans.

For determining the pairwise semantic similarity metric, for each caption-argument span pair, first, a caption embedding for the associated caption and an argument embedding for the associated argument span are obtained using a pre-trained embedding tool. The caption embedding includes word embeddings, each word embedding for each word present in the associated caption. Similarly, the argument embedding includes word embeddings, each word embedding for each word present in the associated argument span. In an embodiment, the pre-trained embedding tool may be a pre-trained GloVe embedding tool.

Next, a caption weighted vector for the associated caption and an argument weighted vector for the associated argument span are determined by using the associated caption embedding and the associated argument embedding respectively. The caption weighted vector includes a weight for each word (word embedding) present in the associated caption. Similarly, the argument weighted vector includes a weight for each word (word embedding) present in the associated argument span.

The weight for each word (word embedding) present in the associated caption and the associated argument span, is assigned by using a pre-trained weight CRF (weight-CRF) model. In an embodiment, a semantic entity extraction component includes the pre-trained weight-CRF model that assigns the semantic class, s∈SC to each word (word embedding) present in the associated caption and the associated argument span. SC represents a set of semantic classes including object classes, attribute classes, geo-fence area classes (spatial-landmark classes) and other classes to account any other semantic class of the word. Then, the weight for each word (word embedding) present in the associated caption and the associated argument span is assigned based on the assigned semantic class. Further, a caption composite vector for the associated caption is determined by interpolating the word embeddings with the corresponding weights. Similarly, the argument composite vector for the associated argument is determined by interpolating the word embeddings with the corresponding weights. For a given k word embedding of either the caption or the argument span, a d-dimensional composite vector is determined by using equation 1:

$$V^d = \Sigma_{i=1}^{k} \lambda_i E(w_i)^d \quad (1)$$

Where $\lambda_i$ refers to the weight of the word i, and $E(w_i)$ represents the embedding of the associated word i.

The pairwise semantic similarity metric $f(A_x, c_y)$ for each caption-argument span pair is determined by using equation 2:

$$f(A_x, c_y) = \frac{V_{A_x}^d \cdot V_{c_y}^d}{\|V_{A_x}^d\| \|V_{c_y}^d\|} \quad (2)$$

Where $V_{A_x}^d$ represents the associated argument composite vector, and $V_{c_y}^d$ represents the associated caption composite vector, x represents number of argument spans in the one or more argument spans corresponding to the associated task type, and y represents number of captions in the one or more captions for each scene object, corresponding to the associated task type.

The one or more captions are re-ranked for each scene based on the associated predefined pairwise semantic similarity metric. In an embodiment, a predefined pairwise semantic similarity metric threshold is used to identify the one or more relevant captions for each scene object, out of the one or more captions. In an embodiment, the predefined pairwise semantic similarity metric threshold ranges between 0.8 and 0.9. In particular, if the pairwise semantic similarity metric for a given caption-argument pair is greater than the predefined pairwise semantic similarity metric threshold, then the associated caption is identified as a relevant caption for the associated scene object, otherwise the associated caption is identified as a not-relevant caption. Parallelly, one or more relevant scene objects out of the one or more scene objects are identified, if any scene object includes at least one relevant caption.

The pre-trained image captioning model may predicts most probable sequence of words (captions), given the image region as a proposal. However, such region proposals often overlap with each other, which results in redundant caption generation. Though a greedy non-maximum suppression (NMS) may be applied to prune region proposals with high overlap, i.e Intersection over Union (IoU), setting an IoU threshold is generally difficult. The difficulty is increased when the robot must detect small, pickable objects, e.g. a pen, and large landmark objects, e.g. a bed, where larger objects may lead to multiple captions when focusing on a part. Two distinct types of redundancy are possible:

Object redundancy—when the multiple bounding boxes are proposed for the same object that results in a caption, where either no attribute is associated with the object, or the attributes are same across the captions.

Caption redundancy—when multiple captions are generated for the same object, whose attribute sets are disjoint.

Hence it is required to determine the unique object present in the scene and unique set of captions for the unique object.

At step 306e of the method 300, the one or more hardware processors 104 of the system 100 are configured to determine one or more unique candidate objects from the one or more relevant scene objects identified at step 306c of the method 300. The unique candidate object refer to s single unique object in each predicted bounding box. Hence the one or more relevant scene objects that are redundant (present in other bounding box(s)) are removed and the bounding boxes are adjusted such that each bounding box contains only one relevant scene object Similarly, one or more candidate captions for each unique candidate object of the one or more unique candidate objects, are determined from the one or more relevant captions for each candidate scene object. In this case, a set of relevant captions that are redundant, out of the one or more relevant captions, are removed and also a set of relevant captions that uniquely define the candidate scene object, out of the one or more relevant captions for each candidate scene object, are merged to obtain a obtain a single meaningful caption that best describes the candidate scene object.

At step 306f of the method 300, the one or more hardware processors 104 of the system 100 are configured to determine a dialogue state for the associated task type, from a predefined set of dialogue states. The dialogue state defines a decision state that best identify the one or more target objects uniquely to execute the task comprised in the associated task type. For this, the associated one or more argument spans are visually grounded on the target scene and map with the one or more unique candidate objects, and the one or more candidate captions for each unique candidate object of the one or more unique candidate objects. If the one or more target objects are uniquely grounded, then the robot may execute the task on the one or more target objects, based on the associated task type.

The dialogue state is used to decide whether a question to be asked to the user by the robot. The predefined set of dialogue states are defined to cover the specific problem that the robot may face. The predefined set of dialogue states include (i) no question (NQ), (ii) ambiguous attribute (AA), (iii) implicit matching attribute (IMA), (iv) attribute mismatch (AM), (v) attribute not found (ANF), (vi) ambiguous object and attribute (AOA), and (vii) not found (NF). A description for each dialogue state is explained in Table 1.

TABLE 1

| Dialogue State | Description |
| --- | --- |
| No question (NQ) | All the information is available. |
| Ambiguous attribute (AA) | Multiple matching objects, but no attribute mentioned in the natural language instruction. |
| Implicitly matching attribute (IMA) | Unique object with attribute, but no attribute mentioned in the natural language instruction. |
| Attribute mismatch (AM) | Unique object, but its attribute is different from the natural language instruction. |
| Attribute not found (ANF) | Unique object without attribute, but attribute is mentioned in natural language instruction. |
| Ambiguous object and attribute (AOA) | Multiple matching objects that have either none or the same attributes. |
| Not found (NF) | The object can't be found, possibly an error in object detection. |

From Table 1, each dialogue state indicate the associated description based on the output of the visual grounding of the one or more argument spans on the target scene to identify the one or more target objects uniquely. Each dialogue state is associated with a decision state out of the set of decision states identifying the one or more target objects to execute the task comprised in the associated task type. The set of decision states indicates the presence of ambiguity in identifying the one or more target objects present in the target scene.

The set of decision states include (i) no-ambiguous, (ii) ambiguous and (iii) abort the task. The decision state 'no-ambiguous' means the available information of the one or more argument spans are sufficient to uniquely identity the one or more target objects based on the on the one or more unique candidate objects, the one or more candidate captions for each unique candidate object. The decision state 'no-ambiguous' means the present of ambiguity and thus the available information of the one or more argument spans may be insufficient or incomplete, or not clear to uniquely identity the one or more target objects based on the on the one or more unique candidate objects, the one or more candidate captions for each unique candidate object. The reasons for the ambiguity may include but are not limited to (i) the relevant target object not found, (ii) multiple target objects may present with same or similar attributes, (iii) multiple number of same target objects present, (iv) objects with different attributes are present in contrast to the desired target object based on the associated one or more argument spans, and so on. The decision state 'abort the task' mean completely aborting the task, if the one or more target objects not found in the target scene, even in case of no ambiguity.

Figure 4:
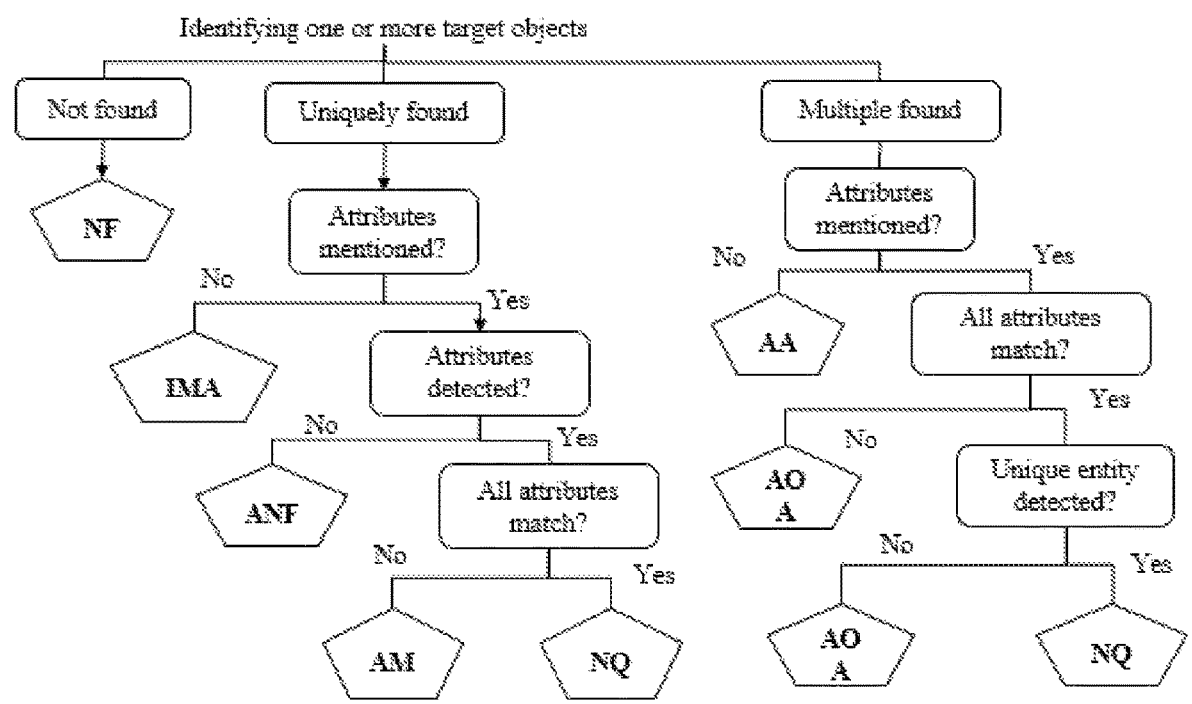
FIG. 4 is an exemplary flow diagram to determine a dialogue state for enabling human-robot interaction to resolve task ambiguity, in accordance with some embodiments of the present disclosure.

In simpler words, the decision state is identified based on the dialogue state. FIG. 4 is an exemplary flow diagram to determine a dialogue state for enabling human-robot interaction to resolve task ambiguity, in accordance with some embodiments of the present disclosure. From FIG. 4, if no relevant target objects found in the target scene, for the one or more target objects, or if multiple relevant target objects found in the target scene for the one or more target objects, then the decision state is identified as 'ambiguous'. Otherwise, if the relevant target objects are uniquely found in the target scene, for the one or more target objects, then the decision state is identified as 'no-ambiguous'

For determining the dialogue state a dialogue state identification CRF is model is used which predicts a semantic class for each object present in the one or more argument spans and the one or more candidate captions. Then the semantic objects are directly compared with the extracted objects present in the one or more argument spans, utilizing the semantic classes that are predicted during the visual uncertainty analysis at step 306d of the method 300. Then if the same object is mentioned in the candidate captions or not is checked. If there is a unique candidate caption matching with the object, then the attributes of both the argument span and the candidate caption are checked. In the case of the argument span mismatch, the AM state is identified. The ANF state is identified when the argument span is missing in the candidate caption. Further, the attribute of the object is not explicitly mentioned in the argument span, then the IMA state is identified. Otherwise, in the case of unique and exact match, the NQ state is identified and refrained from asking subsequent question. In the case of multiple candidate captions, if any attribute of the object is mentioned in the argument span or not is checked. If so, then if multiple candidate captions of the candidate objects contains either the same or no attribute is checked to identify the AOA state. Otherwise, a clarity on the attribute for disambiguation is asked to identify the AA state. Finally, if no candidate captions are found, or if no candidate object is detected then, the NF state is identified.

At step 306g of the method 300, the one or more hardware processors 104 of the system 100 are configured to perform for the associated task type, executing the task comprised in the associated task type, if the decision state is no-ambiguous. That means the one or more argument spans present in the initial instruction set for the associated task is sufficient to visually ground the same on the target scene to identify the target objects. The associated task is executed with the identified target objects. Hence the intervention from the user is not required and the robot need not ask subsequent questions for getting the clarity to resolve the ambiguity.

If the decision state is ambiguous the intervention from the user is required and the robot need to ask a subsequent question for getting the clarity to resolve the ambiguity. The subsequent question is created if the dialogue state is the one where the one or more argument spans can't be grounded uniquely, or such a grounding is uncertain to identify the one or more target objects. The subsequent question is carefully crafted to convey the partial understanding of the target scene of the robot and also pinpoint the ambiguity or uncertainty. Hence to ask the subsequent question, a spatial dialogue with the user is initiated by the robot to receive a second natural language audio instruction.

The spatial dialogue with the user is initiated by the robot by asking a subsequent question to the user. The dialogue initiation module 102A5 initiates the spatial dialogue with the user by the robot by asking the subsequent question. The subsequent question is created by using a predefined question template of a set of predefined question templates. The predefined question template out of the set of predefined question templates is identified based on the associated dialogue state determined at step 306f of the method 300. Table 2 shows an exemplary set of predefined question templates for the dialogue states.

TABLE 2

| Dialogue State | Question Template |
| --- | --- |
| No question (NQ) | — |
| Ambiguous attribute (AA) | I see an attribute-1 object and an attribute-2 object. Which one did you mean? |
| Implicitly matching attribute (IMA) | I see an attribute object. Should I continue? |
| Attribute mismatch (AM) | I see an object, but its attribute. Should I continue? |
| Attribute not found (ANF) | I see an object, but I'm not sure if it is attribute. Should I continue? |
| Ambiguous object and attribute (AOA) | I see #num attribute objects. Which one did you mean? |
| Not found (NF) | I can't find any attribute object. What should I do? |

Each question template contains one or more vacant slots to be filled with suitable words. Hence the identified question template is customized based on the (i) one or more unique candidate objects and the for each unique candidate object of the one or more unique candidate objects, and (ii) the associated one or more argument spans. For example, the object may be filled from the one or more argument spans and the attribute may be filled from the one or more candidate captions, or vice-versa. In another embodiment, both the object and the attribute may filled either only from the one or more argument spans or only from the one or more candidate captions. In Table 2, though one question template for each dialogue state is mentioned, it is not limited and possible to use the multiple question templates by re-phrasing and merging the question templates for the same dialogue state.

The created subsequent question is then asked to the user to receive the second natural language audio instruction The second natural language audio instruction is converted from audio or speech form to text form, to obtain a second instruction text. In an embodiment, the speech-to text conversion tool mentioned at step 302 of the method 300 may be used to convert the second natural language audio instruction into the second instruction text.

The spatial dialogue with the user is continued by repeating the steps 306a through 306g of the method 300, by taking the second instruction text as the initial instruction text, until the decision state becomes no-ambiguous and the associated task(s) is executed. The task-(re) planning module 102A2 re-plans the exaction plan once all the ambiguities are resolved to perform the task. The steps 306a through 306g of the method 300 is repeated until all the task types present in the initial instruction text are completed. The task execution module 102A3 translates the task execution plan to robot actions for completing the task associated with each task type. Finally, the robot abort the task, if the one or more target objects not found in the target scene even after resolving the ambiguities.

In accordance with the present disclosure, the methods and systems use the concept of Talk-to-Resolve (TTR) that initiates continuous dialogue with the user by asking the suitable question by interpreting the observed scene understanding until all the ambiguities are resolved. The present disclosure applies the incremental grounding strategy to generate the semi-grounded execution plan first. The visual grounding of the target object is attempted only when is required by the current action. During the task execution, the present disclosure analyses the current ego-view of the robot to decide if such grounding is possible. In the cases of grounding failure and ambiguity, the present disclosure invokes for the spatial dialogue, which uses visual uncertainty analysis to formulate questions for the user.

The methods and systems generates a most specific questions in more natural way that can be answered by either a binary yes/no or simply choosing an answer from a set of generated suggestions, answer is easily parsed without introducing further ambiguity. The present disclosure asks questions in a natural way that not only ensures that the user can understand the type of confusion, the robot is facing; but also ensures minimal and relevant questioning to resolve the ambiguities.

The methods and systems of the present disclosure identify the relevant object(s) while suppressing the redundant information efficiently via caption redundancy removal and caption merging, based on the arguments present the natural language instruction, and the captions (natural language description) about the object and the scene understanding. Also the present disclosure helps to resolve all possible types of ambiguities in the scene understanding, based on the dialogue state and form the question from the set of question templates where the question is customized based on the scene understanding and the arguments present in the natural language instruction. Hence the present disclosure is efficient and accurate in enabling the human-robot interaction for resolving the task ambiguities.

EXAMPLE SCENARIO

Dataset: To validate the performance of the present disclosure, the pre-trained weight CRF (weight-CRF) model for semantic entity extraction, mentioned at 306d of the method 300, is obtained by training with the annotated captions of indoor images from the Visual Genome dataset present in the paper 'Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotation'. The object specific captions of image regions, attributes, and relationships are selected from 20 images, resulting in 152 captions. The words of each of the captions are annotated as a sequence of semantic classes, using a simple text annotation tool present in the paper 'Jie Yang, Yue Zhang, Linwei Li, and Xingxuan Li. YEDDA: A lightweight collaborative text span annotation tool. In Proceedings of ACL 2018, System Demonstrations, pages 31-36, Melbourne, Australia, July 2018. Association for Computational Linguistics'. The pre-trained weight CRF (weight-CRF) model is trained with 80% of the data, and is evaluated with remaining 20% data.

To evaluate the performance of the dialogue state identification of the present disclosure, a dataset of image-instruction pairs is created and manually annotated each pair with the appropriate dialogue. A total of 88 images of indoor scenes, specifically images of different bedrooms, kitchens, and bathrooms are collected from an indoor scene recognition dataset present in the paper 'Ariadna Quattoni and Antonio Torralba. Recognizing indoor scenes. In 2009 IEEE Conference on Computer Vision and Pattern Recognition, pages 413-420. IEEE, 2009'. For each image, multiple instructions are written for the coverage of multiple dialogue states, resulting in a total of 358 image-instruction pairs and on average of 51 of such pairs per dialogue state. A random split of 20% of the data is selected as a validation set for tuning the semantic class weights $\lambda_i$, the pairwise semantic similarity metric, and image overlapping cutoffs (Intersection over Union (IoU).

Baseline techniques: The baseline techniques that finds the candidate captions are considered to compare the performance of dialogue state identification. Also, the effect of removing redundant captions is analyzed. The baseline techniques used for comparison are: (i) METEOR—METEOR metric for semantic similarity used in the paper 'Mohit Shridhar and David Hsu. Interactive visual grounding of referring expressions for human-robot interaction. In Proceedings of Robotics: Science and Systems, Pittsburgh, Pa., June 2018' for ranking the captions, and use a cutoff threshold to remove the redundant captions, no redundancy suppression is applied, and (ii) Deep Averaging Network (DAN)—A pre-trained deep averaging network mentioned in the paper 'Daniel Cer, Yinfei Yang, Sheng-yi Kong, Nan Hua, Nicole Limtiaco, Rhomni St John, Noah Constant, Mario Guajardo-Cespedes, Steve Yuan, Chris Tar, et al. Universal sentence encoder. arXiv preprint arXiv:1803.11175, 2018' is used as semantic similarity function, for comparing the weighted vector model used in the present disclosure, without any redundancy suppression.

The cutoff thresholds for all the baseline techniques are tuned using the same validation set and use the same task, argument span, and semantic class prediction models. The results of the present disclosure is mentioned under 'TTR' (full model of the present disclosure) and Semantic Weight Interpolation (SWI). In the Semantic Weight Interpolation (SWI), the weighted vector model used in the present disclosure is used for semantic similarity, but no redundancy suppression is applied before the dialogue state prediction. Table 3 shows performance results of dialogue state identification of the TTR (the present disclosure) over the baseline techniques in terms of F1 score.

TABLE 3

| Dialogue State | METEOR | DAN | SWI | TTR |
| --- | --- | --- | --- | --- |
| AA | 0.79 | 0.49 | 0.73 | 0.76 |
| IMA | 0.64 | 0.74 | 0.82 | 0.85 |
| AM | 0.6 | 0.62 | 0.73 | 0.73 |
| ANF | 0.42 | 0.56 | 0.75 | 0.75 |
| AOA | 0.58 | 0.58 | 0.6 | 0.65 |
| NF | 0.84 | 0.88 | 0.94 | 0.94 |
| NQ | 0.57 | 0.58 | 0.56 | 0.68 |
| Average F1 Score | 0.71 | 0.72 | 0.8 | 0.82 |

From Table 3, the METEOR achieves an overall F1 score of 0.71, and is mostly accurate in predicting the AA dialogue state. This may mainly because of the usage of n-gram matching which gives a better ranking to certain captions with a matching object, where no attributes are present in the caption. However, the METEOR is not so accurate in the dialogue states IMA, AM, and ANF. The opposite effect is observed when using the DAN, where the word vectors corresponding to the object are not explicitly given a high priority while averaging, resulting in a low ranking of captions with only objects and thereby leading to poor accuracy in identifying the AA state. However, the overall performance is slightly improved to 0.72. The SWI of the present disclosure outperforms over the METEOR and the DAN by large margins. The SWI achieved a 0.8 score, even without redundancy suppression, particularly improving in the identification of IMA, AM, and ANF states. Finally, the TTR achieves the best score of 0.82, also achieving the best scores in individual states, except for AA. Suppressing redundancy helped to improve the AOA identification, where determining ambiguity is crucial, also improving the false-positive rates of NF and NQ states.

Figure 5:
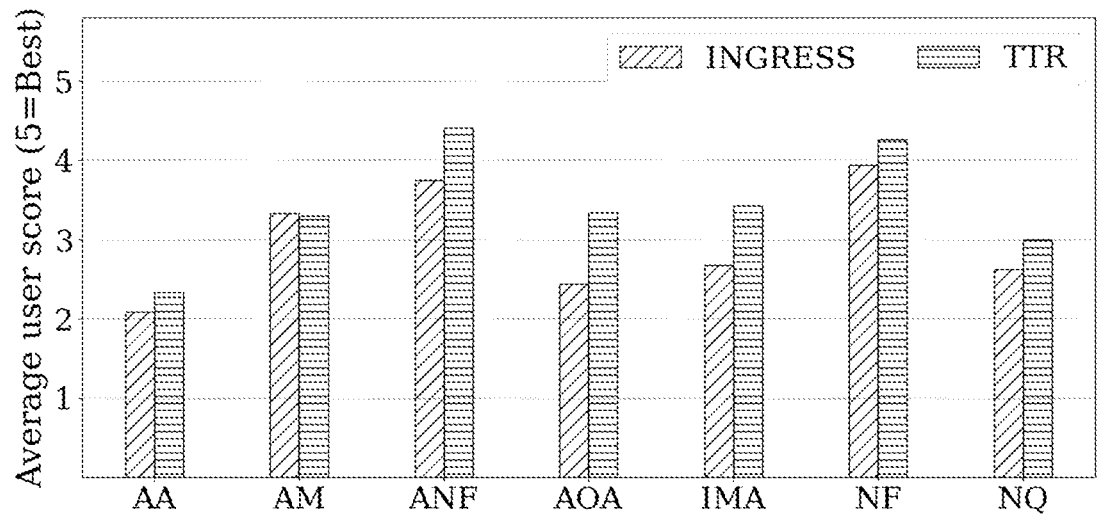
FIG. 5 shows a graph illustrating an overall performance of the present disclosure over state of the art in an average correctness ratings for different dialogue states.

User study: A user study is conducted for the overall evaluation of the TTR (the present disclosure). For comparing our natural language question generation, the technique INGRESS by 'Mohit Shridhar and David Hsu. Interactive visual grounding of referring expressions for human-robot interaction. In Proceedings of Robotics: Science and Systems, Pittsburgh, Pa., June 2018' is used as the state of the art. In the user study, human participants are presented with an instruction given to the robot and the target scene from ego view of the robot. Then, the participants are shown the two questions generated by the TTR and INGRESS, and asked to rate both questions on a 5 point scale, 5 being the best. The participants asked to give their ratings for both perceived correctness and naturalness. A total of 17 participants are volunteered in the user study. Each participant repeats the rating process for 14 random image-instruction pairs, two random samples for each dialogue state. The question generated by the TTR is not disclosed to the participants. FIG. 5 shows a graph illustrating an overall performance of the present disclosure over state of the art INGRESS in an average correctness ratings for different dialogue states. The questions generated by the TTR are significantly perceived to be more accurate for the image instruction pairs that have the ground truth annotation of ANF, AOA, and IMA states. This result is most likely due to the absence of fine-grained dialogue states in INGRESS, therefore such scenarios are tackled by more generic questions.

Figure 6:
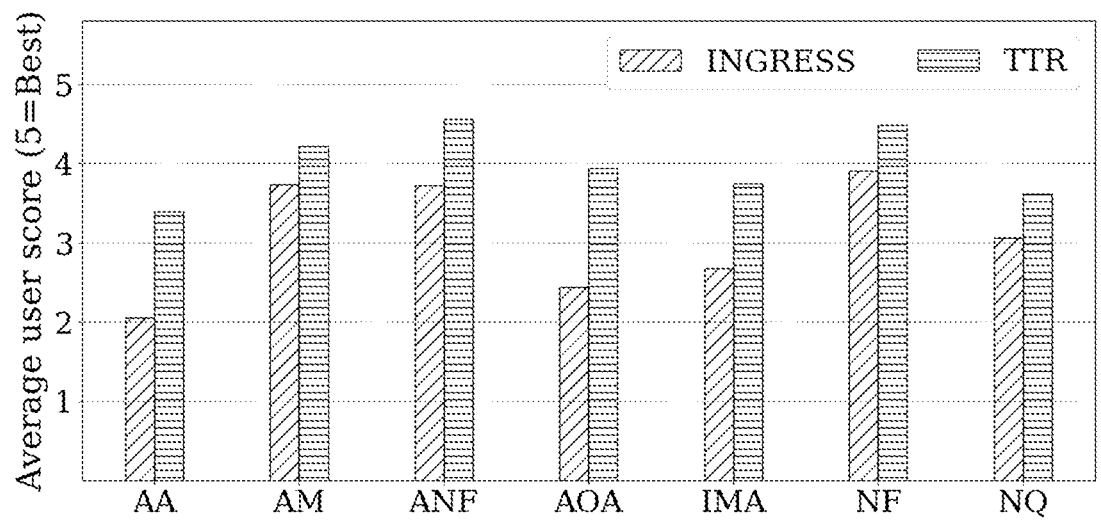
FIG. 6 shows a graph illustrating an overall performance of the present disclosure over state of the art in an average naturalness ratings for different dialogue states.
Figure 7:
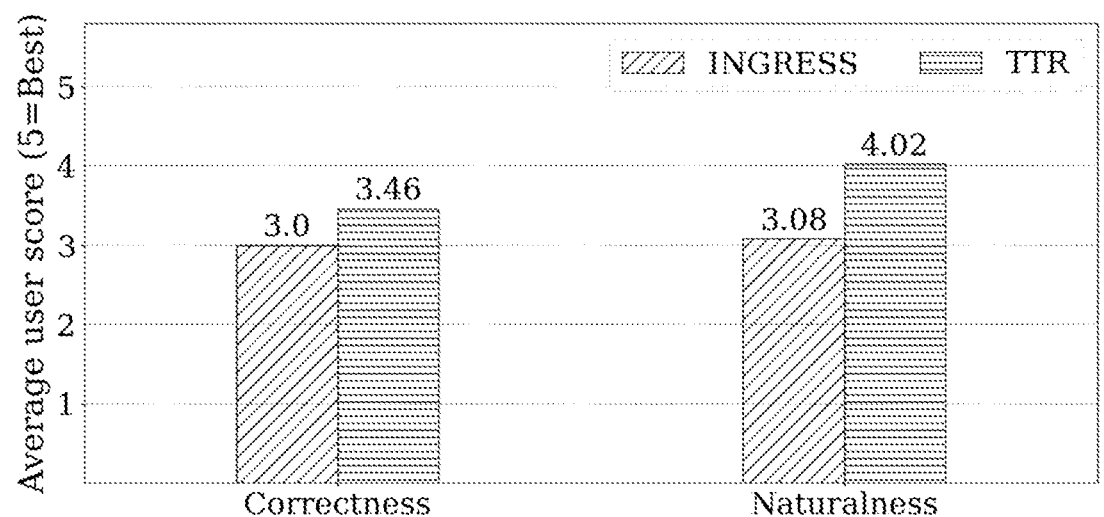
FIG. 7 shows a graph illustrating an overall performance of the present disclosure over state of the art in both an average correctness and an average naturalness ratings in natural question generation.

FIG. 6 shows a graph illustrating an overall performance of the present disclosure over state of the art INGRESS in an average naturalness ratings for different dialogue states. From FIG. 6, the questions generated by the TTR are perceived to be more natural across all the dialogue states. FIG. 7 shows a graph illustrating an overall performance of the present disclosure over state of the art INGRESS in both the average correctness and the average naturalness ratings in natural question generation. From FIG. 7, the present disclosure outperforms over the INGRESS in question generation, both in terms of overall average ratings of correctness and naturalness. The experimental results also supports that the present disclosure is efficient and accurate in enabling the human-robot interaction for resolving the task ambiguities.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for enabling human-robot interaction to resolve task ambiguity, the method comprising the steps of:

receiving, via one or more hardware processors, an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment;

parsing, via the one or more hardware processors, the initial instruction text, to predict one or more task types that are present in the initial instruction text, using a task-conditional random field (task-CRF) model, wherein each task type of the one or more task types is associated with a task of the one or more tasks;

performing, via the one or more hardware processors, each task type at a time, out of the one more task types, until the one or more task types are completed, by:

(a) predicting one or more argument spans for the associated task type, from the initial instruction text, using an argument-conditional random field (argument-CRF) model, wherein at least an argument span of the one or more argument spans is associated with one or more objects present in the environment;

(b) navigating the robot to a target location, for the associated task type, using an initial navigational plan generated based on the associated one or more argument spans and using a pre-built occupancy map of the environment;

(c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object;

(d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans;

(e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object;

(f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; and (g) performing for the associated task type, one of: (i) executing the task comprised in the associated task type, if the decision state is no-ambiguous, (ii) initiating a spatial dialogue with the user to receive a second natural language audio instruction, if the decision state is ambiguous, wherein the second natural language audio instruction is converted into a second instruction text, and repeating steps (a) through (g) by taking the second instruction text as the initial instruction text, until the decision state becomes no-ambiguous, and (iii) abort the task, if the one or more target objects not found in the target scene.

2. The method of claim 1, wherein the pre-built occupancy map comprises one or more geo-fencing areas present in the environment, along with associated annotations.

3. The method of claim 1, wherein initiating the spatial dialogue with the user to receive the second natural language audio instruction, if the decision state is ambiguous, further comprising:

asking a subsequent question to the user, by the robot, wherein the subsequent question is created by customizing a predefined question template of a set of predefined question templates, based on (i) the associated dialogue state, (ii) the one or more unique candidate objects and the one or more candidate captions for each unique candidate object of the one or more unique candidate objects, and (iii) the associated one or more argument spans; and receiving the second natural language audio instruction from the user, by the robot, in response to the subsequent question asked to the user.

4. The method of claim 1, wherein the pairwise semantic similarity metric between (i) each caption of the one or more captions for each scene object, and (ii) each argument span of the associated one or more argument spans, is determined by:

obtaining (i) a caption embedding and a caption weighted vector for the associated caption, and (ii) an argument embedding and an argument weighted vector for the associated argument span;

determining a caption composite vector for the associated caption, based on the associated caption embedding and the associated caption weighted vector;

determining an argument composite vector for the associated argument span, based on the associated argument embedding and the associated argument weighted vector; and determining the pairwise semantic similarity metric between (i) each caption of the one or more captions for each scene object, and (ii) each argument span of the associated one or more argument spans, based on the associated caption composite vector and the associated argument composite vector.

5. The method of claim 1, wherein, the one or more candidate captions for each unique candidate object of the one or more unique candidate objects, from the one or more relevant captions for each candidate scene object, are determined by performing at least one of:

a. removing a set of relevant captions out of the one or more relevant captions, that are redundant; and b. merging a set of relevant captions out of the one or more relevant captions for each candidate scene object, that uniquely define the candidate scene object.

6. The method of claim 1, wherein the predefined set of dialogue states comprises: (i) no question (NQ), (ii) ambiguous attribute (AA), (iii) implicit matching attribute (IMA), (iv) attribute mismatch (AM), (v) attribute not found (ANF), (vi) ambiguous object and attribute (AOA), and (vii) not found (NF).

7. A system for enabling human-robot interaction to resolve task ambiguity, the system comprising:

a memory storing instructions;

one or more Input/Output (I/O) interfaces; and one or more hardware processors coupled to the memory via the one or more I/O interfaces, wherein the one or more hardware processors are configured by the instructions to:

receive an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment;

parse the initial instruction text, to predict one or more task types that are present in the initial instruction text, using a task-conditional random field (task-CRF) model, wherein each task type of the one or more task types is associated with a task of the one or more tasks;

perform each task type at a time, out of the one more task types, until the one or more task types are completed, by:

(a) predicting one or more argument spans for the associated task type, from the initial instruction text, using an argument-conditional random field (argument-CRF) model, wherein at least an argument span of the one or more argument spans is associated with one or more objects present in the environment;

(b) navigating the robot to a target location, for the associated task type, using an initial navigational plan generated based on the associated one or more argument spans and using a pre-built occupancy map of the environment;

(c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object;

(d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans;

(e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object;

(f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; and (g) performing for the associated task type, one of: (i) execute the task comprised in the associated task type, if the decision state is no-ambiguous, (ii) initiate a spatial dialogue with the user to receive a second natural language audio instruction, if the decision state is ambiguous, wherein the second natural language audio instruction is converted into a second instruction text, and repeat steps (a) through (g) by taking the second instruction text as the initial instruction text, until the decision state becomes no-ambiguous, and (iii) abort the task, if the one or more target objects not found in the target scene.

8. The system of claim 7, wherein the pre-built occupancy map comprises one or more geo-fencing areas present in the environment, along with associated annotations.

9. The system of claim 7, wherein the one or more hardware processors (104) are further configured to initiate the spatial dialogue with the user to receive the second natural language audio instruction, if the decision state is ambiguous, by:
asking a subsequent question to the user, by the robot, wherein the subsequent question is created by customizing a predefined question template of a set of predefined question templates, based on (i) the associated dialogue state, (ii) the one or more unique candidate objects and the one or more candidate captions for each unique candidate object of the one or more unique candidate objects, and (iii) the associated one or more argument spans; and
receiving the second natural language audio instruction from the user, by the robot, in response to the subsequent question asked to the user.

10. The system of claim 7, wherein the one or more hardware processors (104) are further configured to determine the pairwise semantic similarity metric between (i) each caption of the one or more captions for each scene object, and (ii) each argument span of the associated one or more argument spans, by:
obtaining (i) a caption embedding and a caption weighted vector for the associated caption, and (ii) an argument embedding and an argument weighted vector for the associated argument span;
determining a caption composite vector for the associated caption, based on the associated caption embedding and the associated caption weighted vector;
determining an argument composite vector for the associated argument span, based on the associated argument embedding and the associated argument weighted vector; and
determining the pairwise semantic similarity metric between (i) each caption of the one or more captions for each scene object, and (ii) each argument span of the associated one or more argument spans, based on the associated caption composite vector and the associated argument composite vector.

11. The system of claim 7, wherein the one or more hardware processors (104) are further configured to determine the one or more candidate captions for each unique candidate object of the one or more unique candidate objects, from the one or more relevant captions for each candidate scene object, by performing at least one of:
a. removing a set of relevant captions out of the one or more relevant captions, that are redundant; and
b. merging a set of relevant captions out of the one or more relevant captions for each candidate scene object, that uniquely define the candidate scene object.

12. The system of claim 7, wherein the predefined set of dialogue states comprises: (i) no question (NQ), (ii) ambiguous attribute (AA), (iii) implicit matching attribute (IMA), (iv) attribute mismatch (AM), (v) attribute not found (ANF), (vi) ambiguous object and attribute (AOA), and (vii) not found (NF).

13. A computer program product comprising a non-transitory computer readable medium having a computer readable program embodied therein, wherein the computer readable program, when executed on a computing device, causes the computing device to:
receive an initial natural language audio instruction from a user, by the robot, to convert the initial natural language audio instruction into an initial instruction text, wherein the initial natural language audio instruction is associated with one or more tasks, each task of the one or more tasks is associated with one or more target objects present in an environment;
parse the initial instruction text, to predict one or more task types that are present in the initial instruction text, using a task-conditional random field (task-CRF) model, wherein each task type of the one or more task types is associated with a task of the one or more tasks;
perform each task type at a time, out of the one more task types, until the one or more task types are completed, by:
(a) predicting one or more argument spans for the associated task type, from the initial instruction text, using an argument-conditional random field (argument-CRF) model, wherein at least an argument span of the one or more argument spans is associated with one or more objects present in the environment;
(b) navigating the robot to a target location, for the associated task type, using an initial navigational plan generated based on the associated one or more argument spans and using a pre-built occupancy map of the environment;
(c) acquiring a target scene for the associated task type, from the target location, using an image capturing device installed at the robot, to: (i) identify one or more scene objects present in the target scene, and (ii) generate one or more captions for each scene object of the one or more scene objects, using a pre-trained image captioning model, wherein each caption of the one or more captions for each scene object, comprises one or more attributes associated with the scene object;
(d) identifying (i) one or more relevant captions for each scene object, out of the one or more captions for each scene object, and (ii) one or more relevant scene objects out of the one or more scene objects, for the associated task type, based on a pairwise semantic similarity metric determined between (i) each caption of the one or more captions for each scene object, and (ii) each argument span of the associated one or more argument spans;
(e) determining for the associated task type: (i) one or more unique candidate objects from the one or more relevant scene objects, by removing the one or more relevant scene objects that are redundant, and (ii) one or more candidate captions for each unique candidate object of the one or more unique candidate objects, from the one or more relevant captions for each candidate scene object;

(f) determining a dialogue state for the associated task type, from a predefined set of dialogue states, based on the one or more unique candidate objects, the one or more candidate captions for each unique candidate object of the one or more unique candidate objects, and the associated one or more argument spans, to define a decision state in identifying the one or more target objects to execute the task comprised in the associated task type, wherein the decision state is one of: (i) no-ambiguous, (ii) ambiguous and (iii) abort the task; and (g) performing for the associated task type, one of: (i) execute the task comprised in the associated task type, if the decision state is no-ambiguous, (ii) initiate a spatial dialogue with the user to receive a second natural language audio instruction, if the decision state is ambiguous, wherein the second natural language audio instruction is converted into a second instruction text, and repeat steps (a) through (g) by taking the second instruction text as the initial instruction text, until the decision state becomes no-ambiguous, and (iii) abort the task, if the one or more target objects not found in the target scene.

* * * * *